(12) United States Patent
Bottiglieri et al.

(10) Patent No.: US 11,161,751 B2
(45) Date of Patent: Nov. 2, 2021

(54) COMPOSITION FOR CONDUCTING MATERIAL REMOVAL OPERATIONS AND METHOD FOR FORMING SAME

(71) Applicant: SAINT-GOBAIN CERAMICS & PLASTICS, INC., Worcester, MA (US)

(72) Inventors: Stephen Bottiglieri, Northbridge, MA (US); Nabil Nahas, Mougins (FR); Douglas E. Ward, Santa Ana, CA (US); Chun-Lung Kuan, Anaheim, CA (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 200 days.

(21) Appl. No.: 16/191,970

(22) Filed: Nov. 15, 2018

(65) Prior Publication Data

US 2019/0153264 A1    May 23, 2019

Related U.S. Application Data

(60) Provisional application No. 62/586,341, filed on Nov. 15, 2017.

(51) Int. Cl.
| | |
|---|---|
| C01G 25/02 | (2006.01) |
| C09K 3/14 | (2006.01) |
| C09G 1/02 | (2006.01) |
| C01F 17/235 | (2020.01) |

(52) U.S. Cl.
CPC ............ *C01G 25/02* (2013.01); *C01F 17/235* (2020.01); *C09G 1/02* (2013.01); *C09K 3/1436* (2013.01); *C01P 2002/84* (2013.01); *C01P 2004/51* (2013.01); *C01P 2004/61* (2013.01); *C01P 2004/62* (2013.01); *C01P 2004/64* (2013.01); *C01P 2006/12* (2013.01)

(58) Field of Classification Search
CPC ......... C09G 1/02; C01F 17/206; C01G 25/02; C09K 3/1436; C01P 2002/84; C01P 2004/51; C01P 2004/61; C01P 2004/62; C01P 2004/64; C01P 2006/12
See application file for complete search history.

(56) References Cited

U.S. PATENT DOCUMENTS

| | | |
|---|---|---|
| 3,715,842 A | 2/1973 | Tredinnick et al. |
| 4,226,623 A | 10/1980 | Koshiyama et al. |
| 4,601,755 A | 7/1986 | Mélard et al. |
| 6,039,633 A | 3/2000 | Chopra |
| 6,551,935 B1 | 4/2003 | Sinha et al. |
| 6,896,590 B2 | 5/2005 | Minamihaba et al. |
| 7,118,686 B2 | 10/2006 | Sinha et al. |
| 7,662,719 B2 | 2/2010 | Sinha et al. |
| 7,722,692 B2 | 5/2010 | Hiraiwa |
| 9,206,337 B2 | 12/2015 | Jung |
| 10,882,025 B2 | 1/2021 | Fajardie |
| 2003/0047710 A1 | 3/2003 | Babu et al. |
| 2004/0116313 A1* | 6/2004 | Nosowitz ............ H01L 21/3212 510/175 |
| 2004/0223898 A1 | 11/2004 | Ota et al. |
| 2005/0003744 A1* | 1/2005 | Feng ...................... C01G 23/04 451/41 |
| 2006/0032836 A1 | 2/2006 | Feng et al. |
| 2006/0249252 A1 | 11/2006 | Chopra et al. |
| 2007/0117497 A1 | 5/2007 | Moeggenborg et al. |
| 2008/0135520 A1 | 6/2008 | Sun |
| 2009/0035202 A1 | 2/2009 | Hiraiwa et al. |
| 2010/0081281 A1* | 4/2010 | Babu ........................ C09G 1/02 438/693 |
| 2010/0163785 A1 | 7/2010 | Kroell et al. |
| 2010/0248593 A1 | 9/2010 | Sakai et al. |
| 2010/0298127 A1 | 11/2010 | Beppu et al. |
| 2012/0104266 A1 | 5/2012 | Yokosawa et al. |
| 2014/0308879 A1* | 10/2014 | Yoshida .................. B24B 57/02 451/41 |
| 2015/0069291 A1* | 3/2015 | Jung ..................... C09K 3/1463 252/79.2 |

(Continued)

FOREIGN PATENT DOCUMENTS

| | | |
|---|---|---|
| CN | 1387943 A | 1/2003 |
| CN | 101155891 A | 4/2008 |

(Continued)

OTHER PUBLICATIONS

Dawkins et al., "The pH-dependant attachment of ceria nanoparticles to silica using surface analytical techniques," Applied Surface Science, 2015, pp. 249-255, vol. 345.

Kawahara et al., "Degradation behavior of ceria-based abrasives slurry during glass polishing," Proceedings of the International Conference on Planarization/CMP Technology 2014, IEEE.

Abiade et al., "Effect of pH on ceria-silica interactions during chemical mechanical polishing," Materials Research Society, 2005, pp. 1139-1145, vol. 20, No. 5.

Matijević et al., Colloid aspects of chemical-mechanical planarization, Journal of Colloid and Interface Science, 2008, pp. 219-237, vol. 320, No. 1.

(Continued)

*Primary Examiner* — Pegah Parvini
*Assistant Examiner* — Ross J Christie
(74) *Attorney, Agent, or Firm* — Abel Schillinger, LLP; Adrian Lawrence

(57) ABSTRACT

A composition can comprise a carrier including a liquid and an abrasive particulate contained in the carrier, the abrasive particulate having, on average, at least 10 wt % cerium oxide in the abrasive particulate and a cerium 3+ ratio (Ce 3+/total cerium) of at least 0.1. In another embodiment, a slurry composition can comprise a liquid carrier comprising water, cerium oxide particles, and free silicate ions, wherein a material removal rate when polishing a silicon oxide wafer can be is increased by at least 3% in comparison to a slurry composition not including free silicate ions.

6 Claims, No Drawings

(56) References Cited

U.S. PATENT DOCUMENTS

| | | | | |
|---|---|---|---|---|
| 2016/0272860 | A1* | 9/2016 | Mizoguchi | C09K 3/1463 |
| 2016/0312069 | A1* | 10/2016 | Suda | C01F 17/206 |
| 2016/0358790 | A1 | 12/2016 | Shi et al. | |
| 2017/0037290 | A1* | 2/2017 | Takahashi | H01L 21/30625 |
| 2020/0085987 | A1* | 3/2020 | Williams | A61L 9/046 |

FOREIGN PATENT DOCUMENTS

| | | |
|---|---|---|
| CN | 101516501 A | 8/2009 |
| CN | 102352188 A | 2/2012 |
| CN | 102516874 A | 6/2012 |
| CN | 101966689 B | 4/2013 |
| CN | 102358826 B | 8/2013 |
| CN | 102559064 B | 1/2014 |
| CN | 103709939 A | 4/2014 |
| CN | 103450811 B | 11/2014 |
| CN | 104497887 A | 4/2015 |
| CN | 104559926 A | 4/2015 |
| CN | 104046244 B | 7/2015 |
| CN | 104131288 B | 9/2015 |
| CN | 104130714 B | 10/2015 |
| CN | 104131286 B | 10/2015 |
| CN | 105315893 A | 2/2016 |
| CN | 105623525 A | 6/2016 |
| CN | 104400624 B | 11/2016 |
| CN | 106479371 A | 3/2017 |
| EP | 2133400 A1 | 12/2009 |
| FR | 2999560 A1 | 6/2014 |
| IN | 4103CH2013 A | 8/2015 |
| JP | H01205978 A | 8/1989 |
| JP | H03149176 A | 6/1991 |
| JP | H11114808 A | 4/1999 |
| JP | 2007061989 A | 3/2007 |
| JP | 2013-129056 A | 7/2013 |
| JP | 2013129056 A | 7/2013 |
| JP | 2014-012311 A | 1/2014 |
| JP | 2017071753 A | 4/2017 |
| RU | 1362088 C | 12/1994 |
| WO | 2001019935 A1 | 3/2001 |
| WO | 2009075022 A1 | 6/2009 |
| WO | 2010038617 A1 | 4/2010 |
| WO | 2013099087 A1 | 7/2013 |
| WO | 2014071859 A1 | 5/2014 |
| WO | 2016186214 A1 | 11/2016 |

OTHER PUBLICATIONS

Kang et al., "Dependence of Non-Prestonian Behavior of Ceria Slurry with Anionic Surfactant on Abrasive Concentration and Size in Shallow Trench Isolation Chemical Mechanical Polishing," Japanese Journal of Applied Physics, 2006, vol. 45.

Kosmulski, "Isoelectric points and points of zero charge of metal (hydr)oxides: 50 years after Parks' review," Advances in Colloid and Interface Science, 2016, pp. 1-61, vol. 238.

Speed, "Environmental aspects of planarization processes," Advances in Chemical Mechanical Planarization, 2016, pp. 229-269.

Kong et al., "On the Flocculation and Agglomeration of Ceria Dispersion," Journal of Dispersion Science and Technology, 2011, pp. 1235-1238, vol. 32, No. 9.

Seo et al., "The Role of Surface Chemistry of Ceria Surfaces on the Silicate Adsorption," ACS Applied Materials & Interfaces, 2014, 22 pages.

Seo et al., "Role of the Oxidation State of Cerium on the Ceria Surfaces for Silicate Adsorption," Applied Surface Science, 2016, 25 pages.

Reed et al., "Exploring the properties and applications of nanoceria: is there still plenty of room at the bottom?" Environmental Science Nano, 2014, 17 pages, vol. 1, Royal Society of Chemistry.

Marrero-Jerez et al., "TPR, XRD and XPS characterization of ceria-based materials synthesized by freeze-drying precursor method," Ceramics International, 2014, pp. 6807-6814, vol. 40.

Suratwala et al., "Relationship between surface µ-roughness and interface slurry particle spatial distribution during glass polishing," Journal of the American Ceramic Society, 2017, pp. 2790-2802, vol. 100.

Manivannan et al., "Mechanism of high selectivity in ceria based shallow trench isolation chemical mechanical polishing slurries," Thin Solid Films, 2010, pp. 5737-5740, vol. 518, No. 20.

Manivannan et al., "The effect of hydrogen peroxide on polishing removal rate in CMP with various abrasives," Applied Surface Science, 2009, pp. 3764-3768, vol. 255, No. 6.

Manivannan et al., "Role of abrasives in high selectivity STI CMP slurries," Microelectric Engineering, 2008, pp. 1748-1753, vol. 85, No. 8.

Nagendra Prasad et al., "Role of Amino-Acid Adsorption on Silica and Silicon Nitride Surfaces during STI CMP," Electrochemical and Solid-State Letters, 2006, pp. G337-G339, vol. 9, No. 12.

Kim et al., "Adsorption behavior of anionic polyelectrolyte for chemical mechanical polishing (CMP)," Journal of Colloid and Interface Science, 2008, pp. 48-52, vol. 319.

Rastegar et al., "Filtration of aqueous colloidal ceria slurries using fibrous filters—An experimental and simulation study," Separation and Purification Technology, 2017, pp. 231-242, vol. 176.

Nelson et al., "Phosphate-Modified Ceria as a Bronsted Acidic/Redox Multifunctional Catalyst," Journal of Materials Chemistry A, 2017, pp. 4455-4466, vol. 5.

Namjesnik et al., "Application of the surface potential data to elucidate interfacial equilibrium at ceria/aqueous electrolyte interface," Adsorption, 2016, pp. 825-837, vol. 22, No. 4-6.

Suda, "Nanocomposite glass abrasives," Journal of the Ceramic Society of Japan, 2014, pp. 244-249, vol. 122, No. 4.

Fujita et al., "Protective effect of CeO2 nanoparticles on photoinduced oxidative damage of DNA," Journal of the Ceramic Society of Japan, 2014, pp. 141-145, vol. 122, No. 2.

Qu et al., "Fabrication of Ni—CeO2 Nanocomposite Coatings Synthesised via a Modified Sediment Co-Deposition Process," International Journal of Electrochemical Science, 2013, pp. 11564-11577, vol. 8.

Rao et al., "Cerium oxide polishing to improve uniformity of diffraction efficiency of beam sampling grating," High Power Laser and Particle Beams, 2013. ((English abstract only)).

Qi et al., "Interfacial Activity of Phosphonated-PEG Functionalized Cerium Oxide Nanoparticles," Langmuir, 2012, pp. 11448-11456, vol. 28, No. 31.

Honma et al., "Development of SrZrO3/ZrO2 nano-composite abrasive for glass polishing," Journal of the Ceramic Society of Japan, 2012, pp. 295-299, vol. 120, No. 7.

Veera Dandu et al., "Role of Different Additives on Silicon Dioxide Film Removal Rate during Chemical Mechanical Polishing Using Ceria-Based Dispersions," Journal of the Electrochemical Society, 2010, pp. H869-H874, vol. 157, No. 9.

Sen et al., "Synthesis and Characterization of Pulse Co-Electrodeposited Nickel/Ceria Nanocomposites," Journal of Nanoscience and Nanotechnology, 2010, pp. 1-6, vol. 10.

Ghosh et al., "Growth of monodisperse nanocrystals of cerium oxide during synthesis and annealing," Journal of Nanoparticle Research, 2010, pp. 1905-1911, vol. 12.

Vincent et al., "Tuning Hydrated Nanoceria Surfaces: Experimental/Theoretical Investigations of Ion Exchange and Implications in Organic and Inorganic Interactions," Langmuir, 2010, pp. 7188-7198, vol. 26, No. 10.

Fresnais et al., "Nanoparticle Aggregation Controlled by Desalting Kinetics," The Journal of Physical Chemistry C, 2009, pp. 16371-16379, vol. 113, No. 37.

Fresnais et al., "Universal scattering behavior of co-assembled nanoparticle-polymer clusters," Physical Review E, 2008, vol. 78.

Qi et al., "Redispersible Hybrid Nanopowders: Cerium Oxide Nanoparticle Complexes with Phosphonated-PEG Oligomers," American Chemical Society Nano, 2008, pp. 879-888, vol. 2, No. 5.

Ong et al., "Attachment of nanoparticles to the AFM tips for direct measurements of interaction between a single nanoparticle and surfaces," Journal of Colloid and Interface Science, 2007, pp. 385-390, vol. 310.

(56) References Cited

OTHER PUBLICATIONS

Hattori et al., "Ultrasonic Vibration Potential of Cerium Dioxide-Alumina Composite Particles in Water," Journal of the Society of Materials Science, 2007, pp. 521-525, vol. 56, No. 6.
Hu et al., "Preparation and Synergetic Polishing of CeO2/ZrO2 Mixed Oxide," Chinese Journal of Organic Chemistry, 2006, vol. 22. ((English abstract only)).
International Search Report & Written Opinion with regard to International Application No. PCT/US2018/061259, dated Apr. 19, 2019, 12 pgs.

* cited by examiner

COMPOSITION FOR CONDUCTING MATERIAL REMOVAL OPERATIONS AND METHOD FOR FORMING SAME

CROSS-REFERENCE TO RELATED APPLICATION

This Application claims priority under 35 U.S.C. § 119(e) to U.S. Provisional Application No. 62/586,341, entitled "COMPOSITION FOR CONDUCTING MATERIAL REMOVAL OPERATIONS AND METHOD FOR FORMING SAME," by Stephen BOTTIGLIERI et al., filed Nov. 15, 2017, which is assigned to the current assignee hereof and is incorporated herein by reference in its entirety.

BACKGROUND

Field of the Disclosure

The following is directed to a composition comprising an abrasive particulate and a carrier, and more particularly, a composition wherein the abrasive particulate includes at least 10% cerium.

Description of the Related Art

Compositions for use in material removal operations are known. Such abrasive compositions may include fixed abrasive compositions wherein a collection of abrasive particles are attached to a body or substrate. Alternatively, certain abrasive compositions can include free abrasives, wherein the abrasive particles are not attached to a body or substrate, but are contained within a liquid carrier as a slurry or mixture. Depending upon the type of material removal operation, one may choose to use a fixed abrasive or free abrasive.

Conventional abrasive slurries are most often used in polishing of materials (e.g., glass, metal, etc.), such as in chemical mechanical planarization (CMP). In a typical CMP process, a substrate (e.g., a wafer) is placed in contact with a moving polishing pad, for example, a rotating polishing pad attached to a platen. A CMP slurry, typically an abrasive and chemically reactive mixture, is supplied to the pad during CMP processing of the substrate. Typically, metal CMP slurries contain an abrasive material, such as silica or alumina, suspended in an oxidizing, aqueous medium. The relative movement of the slurry to the substrate assists with the planarization (polishing) process by chemically and mechanically interacting with the substrate film being planarized due to the effect of the movement of the pad relative to the substrate. Polishing is continued in this manner until the desired film on the substrate is removed with the usual objective being to effectively planarize the substrate. There exist a need to further improve the efficiency of abrasive slurries.

SUMMARY

In one aspect, a method of conducting a material removal operation includes moving an object relative to a substrate comprising silicon, providing a slurry between the object and the substrate, wherein the slurry comprises a carrier comprising a liquid; and an abrasive particulate contained in the carrier, the abrasive particulate comprising a cerium 3+ ratio (Ce 3+/total cerium) of at least 1.

In another aspect, a composition comprises a carrier comprising a liquid and an abrasive particulate contained in the carrier, the abrasive particulate comprises on average at least 10% cerium in the abrasive particulate and wherein the abrasive particulate comprises a cerium 3+ ratio (Ce 3+/total cerium) of at least 0.1.

DETAILED DESCRIPTION

The following description in combination with the figures is provided to assist in understanding the teachings provided herein. The following disclosure will focus on specific implementations and embodiments of the teachings. This focus is provided to assist in describing the teachings and should not be interpreted as a limitation on the scope or applicability of the teachings. However, other teachings can certainly be used in this application.

As used herein, the terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent that certain details regarding specific materials and processing acts are not described, such details may include conventional approaches, which may be found in reference books and other sources within the manufacturing arts.

Embodiments disclosed herein are directed to a composition configured for conducting a material removal operation. For example, the composition can be a slurry used in material removal operations such as polishing. More particularly, the composition may be used for material removal operations on workpieces of an inorganic material. Some suitable inorganic materials can include ceramic materials. The inorganic materials may be amorphous, monocrystalline, polycrystalline or a combination thereof. According to one particular embodiment, the composition or slurry of the embodiments herein may be suitable for finishing and polishing of silicon-containing bodies. It will be appreciated that other inorganic materials may be present within the workpiece, including but not limited to metals, pigments, borides, carbides, nitrides, and the like. In certain instances, the workpiece may by a silicon-containing workpiece, such as monocrystalline or polysilicon silicon. The workpiece may be a wafer including a plurality of electronic devices having metal and silicon containing portions and the following composition may be particularly suitable for use in chemical mechanical planarization of such workpieces. The following is also directed to the formation of the abrasive particulate, the formation of a composition including the abrasive particulate, and a method of using the composition.

The process for forming the composition can begin by creating abrasive particulate according to the embodiments herein. According to one particular embodiment, a method for forming abrasive particulate for use in abrasive slurry can include combining a first precursor material and a second preserve precursor material to form a mixture. Reference herein to first and second precursor materials can include materials which include one or more desired species (i.e., elements or compounds) that can be used to create the finally-formed abrasive particulate. In certain instances, the first or second precursor materials may undergo a chemical change physical change via processing to facilitate selective removal of one or more species that are suitable for use in the abrasive particulate.

In accordance with one embodiment, the first precursor material can include cerium. For example, the first precursor material may include a salt including cerium. Some suitable examples of a first precursor material including a cerium salt can include a nitrate, a chloride, an acetate, a sulfate, carbonate, or any combination thereof. For example the first precursor material may include cerium nitrate, cerium acetate, cerium carbonate, or any combination thereof. In another embodiment, the first precursor material may include an oxide compound including cerium, including for example, but not limited to cerium oxide (e.g., $Ce_2O_3$ or $CeO_2$).

In some instances, the first precursor material may include a cerium-containing compound including cerium in a 3+ valence state. Utilization of such a first precursor material may facilitate formation of an abrasive particulate having a suitable content of cerium or a cerium containing compound in a 3+ valence state. Without wishing to be tied to a particular theory, it is asserted that cerium oxide having cerium in the 3+ valence state (i.e., $Ce_2O_3$) offers improved material removal capabilities on silica-containing workpieces compared to abrasive particulate primarily including cerium oxide in the 4 valence state (i.e., $CeO_2$). Moreover, the embodiments herein may facilitate formation of abrasive particulate having a greater total content (i.e., at the surface and in the bulk of the particulate) of cerium in the 3+ valence state (i.e. $Ce^{3+}$) compared to the content of cerium in the 4+ valence state (i.e., $Ce^{4+}$). Finally, the embodiments herein may facilitate formation of an abrasive particulate having an increased content of $Ce^{3+}$, which may facilitate improved material removal operations.

The second precursor material may include at least one metal element other than cerium. For example, the second precursor material may include a salt that may include at least one transition metal element or rare earth element. In certain instances, the second precursor material may include more than one transition metal element or rare-earth element. In certain instances, the second precursor material may include at least one element from the group of zirconium, titanium, yttrium, praseodymium, lanthanum, hafnium or any combination thereof. In an alternative embodiment, the second precursor material may be a salt, such as a nitrate, a hydroxide, a chloride, an acetate, a sulfate, a carbonate or any combination thereof. In one particular embodiment, the second precursor material may include a material from the group of zirconium oxychloride, zirconium nitrate, zirconium acetate, zirconium hydroxide, zirconium oxide, zirconium carbonate, titanium oxychloride, titanium sulfate, titanium hydroxide, titanium oxide, titanium carbonate, yttrium nitrate, yttrium oxychloride, yttrium hydroxide, yttrium oxide, yttrium carbonate, praseodymium nitrate, praseodymium oxychloride, praseodymium hydroxide, praseodymium oxide, praseodymium carbonate, lanthanum nitrate, lanthanum oxychloride, lanthanum hydroxide, lanthanum oxide, lanthanum carbonate, hafnium nitrate, hafnium oxychloride, hafnium hydroxide, hafnium oxide, hafnium carbonate, or any combination thereof.

The process of combining the first precursor material and second precursor material may include formation of a mixture. The mixture may be a dry mixture or a wet mixture. In particular instances, the mixture may be a dry mixture where the first precursor material and second precursor material are mixed as powder materials. In such embodiments utilizing a dry mixture, the first precursor material and second precursor material may be combined in a dry state and further processed to encourage combination (e.g., physical or chemical) of one or more elements from the first and second precursor materials to form a desired compound. One example of such a process can include a solid-state reaction, which may be facilitated by milling, crushing, mixing, heating, or any combination thereof. In one particular embodiment, the first precursor material may include a cerium-containing material and the second precursor material may include a compound including at least one element other than cerium, and the first precursor material and second precursor material may be combined to facilitate formation of a compound including at least one species from the second precursor material (e.g., zirconium) and the cerium from the first precursor material. Such a compound may be removed from the mixture by further processing.

As noted herein, the process of combining the first precursor material and second precursor material may include formation of a wet mixture. For purposes herein, a wet mixture may include a mixture of materials in two different phases, such as a slurry of solid particles in a liquid phase, or alternatively, a solution including ionic species contained in a solvent. The process of forming a wet mixture may include the formation of a solution, wherein at least one of the first or second precursor materials are soluble in the liquid solvent. The solution may then be processed to facilitate a chemical reaction and/or physical separation of one or more species in the mixture. Some suitable methods of separation can include precipitation process and hydrothermal synthesis, and impregnation. For example, in certain instances, the solution may be processed to create a precipitate that can be selectively removed from the mixture. In another embodiment, one or more species from the first and second precursor materials may chemically react with each other to form a compound, and such a compound may be selectively removed from the liquid mixture.

According to one approach, the first precursor material can include a cerium-containing salt and the second precursor material may include a metal-containing salt, wherein the metal is not cerium and both the first and second precursor materials are dissolved in the solvent (e.g., water). One or more of the ionic species from the first and second precursor materials may be selectively removed from the mixture via precipitation. The precipitation may be facilitated by a change in pH, a change in temperature, a change in the pressure or any combination thereof. According to one particular embodiment, a precipitation process can be utilized to selectively remove a cerium-containing species (e.g., $Ce^{3+}$) or compound from the mixture.

In another embodiment, the process of selectively removing one or more species from the mixture can include a hydrothermal treatment, wherein the temperature of the solution may be altered. The change in temperature may facilitate a chemical reaction or physical change that allows for the selective removal of one or more species from the mixture. For example, in one embodiment, a cerium-containing species (e.g., $Ce^{3+}$) may combine with a species of the second precursor material to form a compound, which may be selectively removed from the mixture. In one embodiment, the compound may be separated by sedimentation or precipitation and filtering.

In yet another embodiment, the process of selectively removing one or more species from the mixture can include an impregnation process. Impregnation may use one soluble material and one insoluble material that may be combined in a liquid mixture, such that a species from the soluble material can impregnate the insoluble material. In one particular embodiment, the process may include impregnation of a zirconium-containing species into a cerium-containing first precursor material. For example, the first precursor material may include a non-soluble cerium-containing material, such as cerium oxide ($Ce_2O_3$), which may be insoluble in the selected liquid material. The process may further include use of a zirconium-containing second precursor material that is soluble in the liquid material (i.e., solvent). Such a zirconium-containing second precursor material may dissociate into cationic and anionic species within the liquid. The zirconium-containing species (e.g., zirconium cation) may be impregnated into the insoluble cerium-containing first precursor material. The impregnation process may be facilitated by controlling and altering the pH, temperature, and/or pressure of the mixture. After impregnating the cerium-containing precursor material with the zirconium-containing species, the impregnated material may be selectively removed from the mixture to undergo further processing.

After combining the first precursor material and second precursor material, the process may include treating the mixture or a component that is selectively removed from the mixture to create an abrasive particulate. According to one embodiment, the mixture or a portion of the mixture, such as a selectively removed component, can be subject to one or more treating processes to facilitate formation of an abrasive particulate. Some suitable treatment processes can include drying, washing, milling, sieving, heating, or any combination thereof.

In accordance with one embodiment, the process of treating can include heating. In more particular instances, the process of treating can include calcining. Calcining refers to a process wherein water is removed from the compound, including water and other volatiles that are chemically bonded within the compound. In certain instances, calcining may be conducted at a calcination temperature within a range of at least 800° C. to not greater than 1300° C.

Additionally, treating of the mixture or a compound selectively removed from the mixture can include treatment in a non-oxidizing atmosphere. Some suitable examples of a non-oxidizing atmosphere can include an inert atmosphere or a reducing atmosphere. More particularly, the process of treating may include calcination of one or more select compounds extracted from the mixture in a reducing atmosphere comprising nitrogen. For example, in one embodiment treating can include heating the one or more select species in an atmosphere comprising flowing hydrogen and nitrogen. In particular instances, treating can include calcining in a non-oxidizing atmosphere. Suitable non-oxidizing atmospheres can include an inert atmosphere or a reducing atmosphere.

In another embodiment, the process of treating can be conducted by heating in an atmosphere having a particular partial pressure of oxygen. For example, the partial pressure of oxygen during heating may be not greater than 100 Pa or not greater than 50 Pa or not greater than 20 Pa or not greater than 10 Pa or not greater than 5 Pa or not greater than 1 Pa or not greater than 0.1 Pa or not greater than 0.01 Pa. Such partial pressures of oxygen may facilitate limited oxidation of certain species, such as the cerium 3+ species.

The non-oxidizing atmosphere, reducing atmosphere, and/or atmosphere with a particular oxygen partial pressure may be helpful for formation of an abrasive particulate having a suitable content of certain species, including for example, cerium having a 3+ valence state as described in embodiments herein. Moreover, it has been noted that the use of a secondary species, such as one or more species from the second precursor material may facilitate enhanced contents of cerium having a 3+ valence state. Without wishing to be tied to a particular theory, it is asserted that the combination of the cerium-containing species with a suitable secondary species (e.g., zirconium, titanium, yttrium, praseodymium, lanthanum, hafnium, and the like) can facilitate oxidation of the secondary species before the oxidation of the cerium-containing species, thus reducing the likelihood of oxidizing the cerium from the 3+ valence state to a cerium-containing species with a different oxidation state (e.g., cerium in the 4+ valence state, such as $CeO_2$). Accordingly, it is possible to form an abrasive particulate having a suitable content of cerium in a 3+ valence state in the bulk and at the surface of the abrasive particulate, which may facilitate improved material removal operations.

In a certain aspect, the treatment of cerium oxide particles alone in a non-oxidizing atmosphere, reducing atmosphere, and/or atmosphere with a particular oxygen partial pressure may be also helpful for formation of an abrasive particulate having a suitable content of cerium in the 3+ valence state.

The abrasive particulate formed from the proceeding embodiments may have features that facilitate improved material removal operations, particularly those for silica-containing workpieces. In one aspect, the abrasive particulate can include at least 10% cerium oxide having a 3+ valence state (i.e. $Ce_2O_3$) in the abrasive particulate, wherein the abrasive particular comprises an average particle size (D50) of not greater than 1 μm.

It will be appreciated that prior to placement of the abrasive particulate into a liquid to form a slurry other processes may be utilized. Including for example, but not limited to, milling, crushing, and sieving to obtain a suitable particle size distribution.

The abrasive particulate may be placed within a carrier comprising a liquid to facilitate the formation of a slurry, which may be provided to customers for use in material removal operations. In certain instances, the carrier can include water, and more particularly, may consist essentially of water. In still one embodiment, the carrier may consist essentially of deionized water.

The compositions including the carrier and the abrasive particulate may be formed to have a particular content of the carrier relative to the content of abrasive particulate. For example, the carrier may be present in an amount of at least 45 wt % for a total weight of the composition (i.e. slurry). In other embodiments, the content of carrier within the slurry can be greater, such as at least 50 wt % or at least 55 wt % or at least 60 wt % or at least 65 wt % or at least 70 wt % or at least 75 wt % or at least 80 wt %. Still, in another non-limiting embodiment, the carrier may be present in an amount of not greater than 97 wt %, such as not greater than 95 wt % or not greater than 90 wt % or not greater than 85 wt % or not greater than 80 wt % or not greater than 75 wt % or not greater than 70 wt % for a total weight of the composition. It will be appreciated that the content of the liquid carrier can be within a range including any of the minimum and maximum values noted above.

In another embodiment, the abrasive particulate may have a particular particle size having average particle size (D50) that may facilitate certain material removal operations, and in particular, a polishing operation. For example, the abrasive particulate may have an average particle size (D50) of not greater than 20 µm, such as not greater than 15 µm or not greater than 10 µm or not greater than 5 µm or not greater than 2 µm or not greater than 1 µm or not greater than 900 nm or not greater than 800 nm or not greater than 700 nm or not greater than 600 nm or not greater than 500 nm or not greater than 400 nm or not greater than 300 nm or not greater than 200 nm or not greater than 100 nm or not greater than 90 nm or not greater than 80 nm or not greater than 70 nm or not greater than 60 nm or not greater than 50 nm or not greater than 40 nm or not greater than 30 nm or not greater than 20 nm or not greater than 10 nm. In still another non-limiting embodiment, the abrasive particulate may have an average particle size (D50) of at least 1 nm or at least 5 nm, or at least 10 nm or at least 20 nm or at least 50 nm or at least 100 nm or at least 200 nm, or at least 500 nm or at least 1 micron. It will be appreciated that the abrasive particulate may have an average particle size (D50) within range including any of the minimum and maximum values noted above. The average particle size (D50) of the abrasive particulate can be measured using laser diffraction methods on a Malvern Nanosizer Dynamic Light Scattering instrument.

In another embodiment, the abrasive particulate can have a certain density that can facilitate use as an abrasive material. For example, the density of the abrasive particulate may be at least 90% theoretical density, or at least 95% theoretical density or at least 98% theoretical density or at least 99% theoretical density.

The abrasive particulate may have a certain content of total cerium within the abrasive particulate. Reference herein to total cerium is the amount of cerium in any form and any valence state, including for example, but not limited to $Ce_2O_3$ and $CeO_2$. For example, in one embodiment, the abrasive particulate may include an average at least 10 wt % total cerium. In further instances, the average content of total cerium within the abrasive particulate can be at least 15 wt % or at least 20 wt % or at least 25 wt % or at least wt 30% or at least 40 wt % or at least 50 wt % or at least 60 wt % or at least 70 wt % or at least 80 wt % or at least 85 wt %.

In one particular embodiment, the abrasive particulate may consist essentially of cerium oxide ($Ce_2O_3$). In still one non-limiting embodiment, the abrasive particulate may have on average not greater than 85 wt % total cerium for the abrasive particulate, such as not greater than 83 wt % or not greater than 80 wt % or not greater than 70 wt % or not greater than 60 wt % or not greater than 50 wt % or not greater than 40 wt % or not greater than 30 wt % or not greater than 20 wt % total cerium. It will be appreciated that the abrasive particulate can have an average content of total cerium within a range including any of the percentages noted above.

In particular instances, the cerium can be in the form of an oxide compound or a mixed complex oxide, e.g., a mixed oxide of zirconium oxide and cerium oxide. For such embodiments, the abrasive particulate may include at least 10 wt % cerium oxide and not greater than 100 wt % cerium oxide, such as within a range of at least 10 wt % and not greater than 90 wt % or within a range of at least 20 wt % and not greater than 80 wt.

According to an embodiment, the abrasive particulate may include at least 10 wt % cerium oxide for a total weight of the abrasive particulate or at least 10 wt % cerium oxide or at least 15 wt % cerium oxide or at least 20 wt % cerium oxide or at least 30 wt % cerium oxide or at least 40 wt % cerium oxide or at least 50 wt % cerium oxide or at least 60 wt % cerium oxide or at least 70 wt % cerium oxide or at least 80 w % cerium oxide or at least 90 wt % cerium oxide or at least 95 wt % cerium oxide for a total weight of the abrasive particulate. In another non-limiting embodiment, the abrasive particulate may include not greater than 99 wt % cerium oxide for a total weight of the abrasive particulate, such as not greater than 90 wt % cerium oxide or not greater than 80 wt % cerium oxide or not greater than 70 wt % cerium oxide or not greater than 60 wt % cerium oxide or not greater than 55 wt % cerium oxide or not greater than 50 wt % cerium oxide or not greater than 45 wt % cerium oxide or not greater than 40 wt % cerium oxide or not greater than 35 wt % cerium oxide or not greater than 30 wt % cerium oxide or not greater than 25 wt % cerium oxide or not greater than 20 wt % cerium oxide or not greater than 15 wt % cerium oxide or not greater than 10 wt % cerium oxide for a total weight of the abrasive particulate. It will be appreciated that the amount of cerium oxide can be within a range including any of the minimum and maximum percentages noted above.

In another embodiment, the abrasive particulate may have a certain content of cerium in a particular valence state, such as a 3+ valence state (e.g., $Ce_2O_3$) within the abrasive particulate. For example, in one embodiment the abrasive particulate may include on average at least 10 wt % cerium in a 3+ valence state based on the total amount of cerium in the particulate. In other instances, the abrasive particulate may have an average content of cerium in a 3+ valence state of at least 25 wt % or at least 30 wt % or at least 40 wt % or at least 50 wt % or at least 60 wt % or at least 70 wt % or at least 80 wt % or at least 90 wt % or even at least 95 wt %. In one particular embodiment, the cerium contained in the abrasive particulate may consist essentially of cerium in a 3+ valence state. In another non-limiting embodiment, the abrasive particulate may have on average not greater than 99 wt % or the cerium in a 3+ valence state, such as not greater than 95 wt % or not greater than 90 wt % or not greater than 80 wt % or not greater than 70 wt % or not greater than 60 wt % or not greater than 50 wt % cerium in a 3+ valence state within the abrasive particulate. It will be appreciated that the cerium contained in the abrasive particulate can have an average content of cerium in a 3+ valence state based on the total amount of cerium within a range including any of the percentages noted above. Furthermore, the percentages noted above may be measured in weight percent or volume percent depending upon the method utilized to measure the content of cerium in the 3+ valence state.

In certain instances, the content of cerium, and particularly, the content of cerium in a 3+ valence state, may be controlled to facilitate improved material removal operations. For example, in one embodiment, the abrasive particulate can have a cerium 3+ ratio (Ce 3+/total cerium) of at least 0.1, such as at least 0.15 or at least 0.2 or at least 0.25 or at least 0.3 or at least 0.35 or at least 0.4 or at least 0.45 or at least 0.5 or at least 0.55 or at least 0.6 or at least 0.65 or at least 0.7 or at least 0.75 or at least 0.8 or at least 0.85 or at least 0.9 or at least 0.95 or at least 0.99. Still, in another embodiment, the cerium 3+ ratio (Ce 3+/total cerium) may be 1, or not greater than 0.99 or not greater than 0.95 or not greater than 0.9 or not greater than 0.85 or not greater than 0.8 or not greater than 0.75 or not greater than 0.70 or not greater than 0.65 or not greater than 0.6 or not greater than 0.55 or not greater than 0.5 or not greater than 0.45 or not greater than 0.4 or not greater than 0.35 or not greater than 0.3 or not greater than 0.25 or not greater than 0.2. It will be appreciated that the abrasive particulate can have a cerium 3+ ratio within a range including any of the values noted above.

In accordance with one particular aspect, the abrasive particulate may have a certain content of cerium in the 3+ valence state relative to the content of cerium in the 4+ valence state within the abrasive particulate. Control of the relative contents of cerium in the 3+ valence state relative to the cerium in the 4+ valence state may facilitate improved performance of the abrasive particulate and associated slurry composition in certain material removal operations. In one embodiment, the abrasive particulate can include $Ce_2O_3$ and $CeO_2$, and the abrasive particulate can have a ratio ($Ce^{3+}/Ce^{4+}$) of at least 0.2. In other instances, the ratio ($Ce^{3+}/Ce^{4+}$) can be at least 0.3, such as at least 0.4, at least 0.5, at least 0.7, at least 0.9, at least 1, at least 1.1, such as at least 1.2 or at least 1.3 or at least 1.4 or at least 1.5 or at least 1.6 or at least 1.7 or at least 1.8 or at least 1.9 or at least 2 or at least 2.1 or at least 2.2 or at least 2.5 or at least 2.7 or at least 3 or at least 3.2 or at least 3.5 or at least 3.7 or at least 4 or at least 4.5 or at least 5 or at least 6 or at least 7 or at least 8 or at least 9 or at least 10. Still, in another non-limiting embodiment, the ratio ($Ce^{3+}/Ce^{4+}$) can be not greater than 1000 such as not greater than 500 or not greater than 100 or not greater than 50. It will be appreciated that the ratio ($Ce^{3+}/Ce^{4+}$) can be within a range including any of the minimum and maximum values noted above, including for example within range of at least 1 and not greater than 1000 or at least 1.1 and not greater than 500 or at least 1.5 and not greater than 50.

The total content of cerium in a particle can be measured using inductively coupled plasma (ICP) mass spectroscopy. After conducting ICP on a suitable sample size of abrasive particulate to obtain a statistically relevant average value of cerium in the abrasive particulate, further analysis may be completed to determine the valence states of the cerium contained in the abrasive particulate. Some suitable methods to analyze the valence state of the cerium contained in the abrasive particulate can be thermogravimetric analysis (TGA), temperature programmed oxidation (TPO) or X-ray photoelectron spectroscopy (XPS). TGA is completed in air up to 800° C. and measures the change in weight for a given amount of cerium oxide. Because cerium oxide with cerium in a 3+ valence state (i.e., $Ce_2O_3$) has a different molar mass than cerium oxide with cerium in a 4+ valence state (i.e., $CeO_2$), the TGA can be used to measure the change in weight of the abrasive particulate sample, and any weight increase can be presumed to be the change in weight from oxidation of $Ce_2O_3$ to $CeO_2$ via oxidation (i.e., ½ $O_2$). Thus the weight percent of cerium in the 3+ valence state can be determined via TGA.

TPO may be used in a similar manner to TGA, except that TPO will measure the amount of oxygen consumed in the atmosphere during oxidation of the cerium-oxide containing sample and the oxidation of $Ce_2O_3$ to $CeO_2$. The oxygen consumed can be used to calculate the amount of cerium in a 3+ valence state in the original abrasive particulate sample. Moreover, such information can also be used with the ICP data to evaluate the content of cerium in the 3+ valence state relative to the total content of cerium in the abrasive particulate sample. Additionally, in the context of an abrasive particulate sample containing of cerium oxide, one can use the foregoing methods to analyze the content of cerium in the 4+ valence state and assuming that all cerium oxide not in the 3+ valence state is in the 4+ valence state, such information can be used to calculate the cerium ratio.

XPS may be used to measure the amount of cerium in the 3+ valence state and cerium in the 4+ valence state at the same time. The analysis can be completed according to the method as disclosed in Marrero-Jerez, J., et al, "TPR, XRD and XPS characterization of ceria-based materials synthesized by freeze-drying precursor method." Ceramics International, 40, (2014) 6807-6814.

The particle size distribution of the abrasive particulate may be further defined by a D90-D10 range value, which may facilitate improved performance of the composition and/or slurry. The D90 can represent the particle size value including 90% of the particles sizes in the distribution, such that less than 10% of the particles in the distribution have a size greater than the D90 value. D10 can represent a particle size value wherein only 10% of the particles in the distribution are smaller than the D10 particle size value. The D90-D10 range value describes the breadth of the particle size distribution between the D90 and D10 values. According to one embodiment the D90-D10 value range can be not greater than 20 microns, such as not greater than 18 microns or not greater than 16 microns or not greater than 14 microns or not greater than 12 microns or not greater than 10 microns or not greater than 8 microns or not greater than 6 microns or not greater than 4 microns or not greater than 2 microns or not greater than 1 micron (1000 nm) or not greater than 900 nm or not greater than 800 nm or not greater than 700 nm or not greater than 600 nm or not greater than 500 nm or not greater than 400 nm or not greater than 300 nm or not greater than 200 nm or not greater than 100 nm or not greater than 80 nm or not greater than 60 nm or not greater than 40 nm or not greater than 20 nm or not greater than 10 nm. Still, in another non-limiting embodiment, the D90-D10 range value can't be at least 5 nm, such as at least 10 nm or at least 20 nm or at least 40 nm or at least 60 nm or at least 80 nm or at least 100 nm or at least 200 nm or at least 300 nm or at least 400 nm or at least 500 nm or at least 600 nm or at least 700 nm or at least 800 nm or at least 900 nm or at least 1000 nm or at least 2 microns or at least 3 microns or at least 4 microns or at least 5 microns or at least 6 microns or at least 8 microns or at least 10 microns or at least 12 microns or at least 14 microns or at least 16 microns. It will be appreciated that the D90-D10 range value can be within range including any of the minimum maximum values noted above, including for example, within range of at least 5 nm to not greater than 20 microns.

The particle size distribution of the abrasive particulate may be further defined by a span value, which can be the range value divided by the average particle size, or otherwise represented as the ((D90-D10)/D50). The span value may be at least 0.1, such as at least 0.2 or at least 0.3 or at least 0.4 or at least 0.5 or at least 0.8 or at least 1 or at least 2 or at least 3 or at least 4 or at least 5 or at least 6 or at least 7 or at least 8 or at least 8 or at least 10 or at least 11 or at least 12 or at least 13 or at least 14 or at least 15 or at least 16 or at least 17 or at least 18 or at least 19. Still, in one non-limiting embodiment, the span value ((D90-D10)/D50) can be not greater than 20, such as not greater than 19 or not greater than 18 or not greater than 17 or not greater than 16 or not greater than 15 or not greater than 14 or not greater than 13 or not greater than 12 or not greater than 11 or not greater than 10 or not greater than 9 or not greater than 8 or not greater than 7 or not greater than 6 or not greater than 5 or not greater than 4 or not greater than 3 or not greater than 2 or not greater than 1. It will be appreciated that the span value can be within a range including any of the minimum and maximum values noted above.

The abrasive particulate can include at least one other metal element. The metal element may be combined in the same particle with the cerium-containing species, or more particularly, may be combined in the same phase as the cerium-containing species, and still more particularly, may be part of the same crystal structure in the discrete crystallites including the cerium-containing species. The at least one other element may include a transition metal element or rare earth element. More particularly, the at least one other element may include an element from the group of zirconium, titanium, yttrium, praseodymium, lanthanum, hafnium or any combination thereof.

The abrasive particulate may have a certain content of the at least one other metal element for a total content of the abrasive particulate (e.g., zirconium, titanium, yttrium, praseodymium, lanthanum, hafnium). The at least one other metal element may be an optional addition.

In one embodiment, the abrasive particulate may include on average at least 10 wt % of the at least one other element based on the total weight of the abrasive particulate. In further instances, the content of the at least one other element can be at least 15 wt % or at least 20 wt % or at least 25% or at least 30% or at least 40% or at least 50% or at least 60% or at least 70% or at least 80% based on the total weight of the abrasive particulate. Still, in another non-limiting embodiment, the abrasive particulate may have on average not greater than 85 wt % total content of the at least one other metal element for the abrasive particulate, such as not greater than 75 wt % or not greater than 70 wt % or not greater than 60 wt % or not greater than 50 wt % or not greater than 40 wt % or not greater than 30 wt % or not greater than 20 wt % total of the other metal element. It will be appreciated that the abrasive particulate can have an average total content of the other metal element within a range including any of the percentages noted above. Furthermore, the percentages noted above may be measured in weight percent or volume percent depending upon the method utilized to measure the content of cerium.

In at least one embodiment, the abrasive particulate can include a polycrystalline material made of a plurality of crystalline grains contained within each abrasive particulate, which can be separated from each other by grain boundaries. In accordance with an embodiment, the crystalline grains of the polycrystalline material may include a particular complex oxide, including for example a complex oxide having cerium oxide and at least one other metal oxide compound. In particular instances, the complex oxide may be a solid solution including cerium oxide and the at least one other metal oxide compound. The solid solution can be a single phase material including cerium oxide and the at least one other metal oxide material combined into the same crystal structure. In certain instances, the abrasive particulate may include a polycrystalline material, wherein at least a portion of the crystalline grains include a cubic or tetragonal crystalline structure. In particular instances, at least a majority of the crystalline grains may have a cubic or tetragonal crystalline structure. Moreover, such a cubic or tetragonal crystalline structure may be a result of a solid solution of a cerium-cerium oxide material combined with at least one other metal oxide compound, such as zirconium oxide.

For example, in one particular embodiment, the complex oxide within the individual crystalline grains can be a solid solution of cerium and zirconium in an oxide compound. In such embodiments, at least 10% of the crystalline grains can include cerium oxide present in a 3+ valence state (i.e., $Ce_2O_3$) as part of a solid solution with at least one other metal oxide compound. In other embodiment, the content of crystalline grains including the cerium oxide and one other metal oxide composition in a solid solution can be at least 30%, such as at least 40% or at least 50% or at least 60% or at least 70% or at least 80% or at least 90% or at least 95% of the crystalline grains. In one embodiment, essentially all of the crystalline grains and the polycrystalline abrasive particulate can be include a solid solution including cerium oxide ($Ce_2O_3$) and at least one other metal oxide compound, such as the zirconium oxide. It will be appreciated that the percentage may be measured as volume percent or weight percent depending upon the method of measuring the contents of noted compounds.

As noted in embodiments herein, the abrasive particulate can include a complex oxide composition including zirconium, and in certain instances, zirconium oxide. In such instances, the content of zirconium may be controlled to facilitate improved material removal operations. For example, in one embodiment, the abrasive particulate can include at least 5 wt % zirconium oxide for total weight of the abrasive particulate, such as at least 10 wt % or at least 15 wt % or at least 20 wt % or at least 30 wt % or at least 40 wt % or at least 50 wt % were at least 60 wt % or at least 65 wt % or at least 70 wt % or at least 80 wt % zirconium oxide for a total weight of the abrasive particulate. Still and another non-limiting embodiment, the abrasive particulate may include not greater than 90 wt % zirconium oxide for total weight of the abrasive particulate, such as not greater than 85 wt % or not greater than 80 wt % or not greater than 75 wt % or not greater than 70 wt % or not greater than 65 wt % or not greater than 60 wt % or not greater than 55 wt % or not greater than 50 wt % or not greater than 45 wt % or not greater than 40 wt % or not greater than 35 wt % or not greater than 30 wt % or not greater than 25 wt % or not greater than 20 wt % or not greater than 15 wt % or not greater than 10 wt % zirconium oxide for a total weight of the abrasive particulate. It will be appreciated that the amount of zirconium oxide within the abrasive particulate may be within a range including any of the minimum and maximum percentages noted above.

In yet another embodiment, the abrasive particulate may include a complex oxide including cerium oxide and zirconium oxide and further comprising a total cerium-to-zirconium ratio ((total cerium)/total zirconium)) of at least 0.2. The cerium can include all cerium, including cerium having a 3+ valence state or 4+ valence state. In another embodiment, the total cerium-to-zirconium ratio can be at least 0.3, such as at least 0.4 or at least 0.5 or at least 0.6 or at least 0.8 or at least 0.9 or at least 1 or at least 1.1 or at least 1.2 or at least 1.3 or at least 1.4 or at least 1.5 or at least 1.6 or at least 1.7 or at least 1.8 or at least 1.9 or at least 2 or at least 2.1 or at least 2.2 or at least 2.5 or at least 2.7 or at least 3 or at least 3.2 or at least 3.5 or at least 3.7 or at least 4 or at least 4.5 or at least 5 or at least 6 or at least 7 or at least 8 or at least 9 or at least 10. Still, in at least one non-limiting embodiment, the total cerium-to-zirconium ratio may be not greater than 1000, such as not greater than 500 or not greater than 100 or not greater than 50. It will be appreciated that the total cerium-to-zirconium ratio may be within range including any of the minimum and maximum values noted above.

In certain instances, the composition including the carrier and the abrasive particulate may have a certain pH, which may facilitate improved material removal operations. For example, the composition can have a pH within a range of at least 1 and not greater 12. In other instances, the pH of the composition may be at least 3 and not greater than 11.5. In a particular aspect, the pH can be at least 9 and not greater than 11.

In yet another embodiment, the abrasive particulate may be formed to have a specific surface area that may facilitate improved performance in certain material removal operations. For example, the abrasive particulate can have a specific surface area of not greater than 100 m$^2$/g, such as not greater than 90 m$^2$/g or not greater than 80 m$^2$/g or not greater than 70 m$^2$/g or not greater than 60 m$^2$/g or not greater than 50 m$^2$/g or not greater than 40 m$^2$/g or not greater than 30 m$^2$/g or not greater than 20 m$^2$/g or not greater than 10 m$^2$/g or not greater than 1 m$^2$/g or not greater than 0.9 m$^2$/g or not greater than 0.8 m$^2$/g or not greater than 0.7 m$^2$/g or not greater than 0.6 m$^2$/g or not greater than 0.5 m$^2$/g or not greater than 0.4 m$^2$/g or not greater than 0.3 m$^2$/g or not greater than 0.2 m$^2$/g. Still, in another non-limiting embodiment, the specific surface area of the abrasive particulate can be least 0.1 m$^2$/g, such as at least 0.2 m$^2$/g or at least 0.3 m$^2$/g or at least 0.4 m$^2$/g or at least 0.5 m$^2$/g or at least 0.6 m$^2$/g or at least 0.7 m$^2$/g or at least 0.8 m$^2$/g or at least 0.9 m$^2$/g or at least 1 m$^2$/g or at least 10 m$^2$/g or at least 20 m$^2$/g or at least 30 m$^2$/g or at least 40 m$^2$/g or at least 50 m$^2$/g or at least 60 m$^2$/g or at least 70 m$^2$/g or at least 80 m$^2$/g. It will be appreciated that the specific surface area can be within range including any of the minimum maximum values noted above, including for example, within range of at least 0.1 m$^2$/g to not greater than 100 m$^2$/g.

In another embodiment, the composition may include certain optional additives, including additives from the group of dispersants, surfactants, lubricants, or, any combination thereof. Some suitable examples of dispersants include sodium hexametaphosphate, polyvinylpyrrolidone, sodium polynaphthalene sulfonate, sodium polymethacrylate, ammonium polymethacrylate, sodium polyacrylate, ammonium polyacrylate, sodium lignosulfonate. Some suitable examples of surfactants can include oleic acid, cetyltrimethylammonium bromide, dodecanthiol, oleylamine, sodium dodecyl sulfate, hydroxyl phosphono-acetic acid or any combination thereof. Some suitable examples of lubricants can include fluorosurfactants, zinc stearate, manganese dioxide, molybdenum disulfide, aluminosilicates, organosilicone copolymers or any combination thereof.

In still another embodiment, the abrasive particulate may have limited contents of certain species. For example, the abrasive particulate may have not greater than 1 wt % of at least one of a carbide, nitride, boride, diamond, or any combination thereof for a total weight of the abrasive particulate. In another embodiment, the abrasive particulate may have not greater than 0.5 wt % such as not greater than 0.1 wt % or not greater than 0.01 wt % or even not greater than 0.001 wt % of at least one of a carbide, nitride, boride, diamond, or any combination thereof. In one particular embodiment, the abrasive particulate can be free of any carbides, nitrides, borides, diamond, or any combination thereof.

In further instances, the abrasive particulate may be formed such that it includes limited contents of certain oxide-containing species, including for example, not greater than 1 wt % of silica, alumina, boron oxide, or any combination thereof for a total weight of the abrasive particulate. In another embodiment, the abrasive particulate may have less than 0.5 wt %, such as not greater than 0.1 wt % or not greater than 0.01 wt % or not greater than 0.001 wt % of silica, alumina, boron oxide, or any combination thereof for a total weight of the abrasive particulate.

Still, in an alternative embodiment, the slurry can include the abrasive particulate and a second particulate that is distinct from the abrasive particulate. The second particulate may be an abrasive particle that is blended with the abrasive particulate to facilitate improved performance. Suitable types of materials for use as the second particulate can include oxides, carbides, nitrides, diamond, or any combination thereof. More specifically, some suitable examples of materials for use as the second particulate may include alumina, silica, diamond, cubic boron nitride, silicon carbide, boron carbide, zirconia-containing particles (e.g., pure zirconia particles), or any combination thereof.

In still other instances, the abrasive particulate may have limited contents of alkali and/or alkali-earth containing species. Alkali and alkali-earth elements are elements found in Groups 1 and 2 of the Periodic Table of Elements. Limited contents of such species may be suitable for certain applications. The abrasive particulate may be formed such that it includes not greater than 1 wt % of any alkali and/or alkali-earth containing species for the total weight of the abrasive particulate. In other instances, the total content of one or more alkali or alkali-earth containing species in the abrasive particulate may be not greater than 0.5 wt % or not greater than 0.1 wt % or not greater than 0.01 wt % or not greater than 0.001 wt % for a total weight of the abrasive particulate.

In another aspect, the composition of the present disclosure containing the zirconia-ceria double oxide particles may have a particular stability to keep cerium ions in the $Ce^{3+}$ stage that is better than in conventional ceria-containing slurries. For example, the composition may have a stability to withstand oxidation of $Ce^{3+}$ which is at least 10% greater compared to a slurry comprising as abrasive particles cerium oxide only, such as at least 15% greater, or at least 20% greater or at least 25% greater or at least 30% greater or at least 40% greater or at least 50% greater at least 75% greater at least 90% greater than a conventional ceria-containing slurry.

According to another embodiment, the abrasive particulate may have a certain color, which may indicate the type of material in the abrasive particulate. For example, the abrasive particulate may have a green or green-like color when it includes a certain amount of cerium in a 3+ valence state. In at least one embodiment, the abrasive particulate may have an absorption band at 31,000 cm$^{-1}$ as measured by UV-visible spectrometry (in absorbance or in transmittance) using a Thermo Scientific Evolution 300 spectrophotometer. UV-Visible on the abrasive particulate is completed in a reflection state, whereas the measurements on the slurry are completed in transmission mode. In another embodiment, the abrasive particulate can have a color as analyzed via colorimetry with a CIELab spectrophotometer. The abrasive particulate can have a negative "a" component value of not greater than −10 or even not greater than −20. The abrasive particulate may also have a L" value component of not greater than 90 or not greater than 80. For the measurement, 10 g of powder is pressed at 20 MPa into a 30 mm diameter pellet. Measurements are completed on a Hunterlab MiniScan EZ spectrophotometer and are an average on 10 values taken across the sample.

The composition can be in the form of a slurry suitable for use in material removal operation. One process for use of the composition can include moving an object relative to a substrate comprising silicon. Such an object can include a polishing pad or other suitable object used in material removal operations. The slurry composition can be disposed between the object and the substrate and include any of the features of the embodiments herein. The object and the workpiece can be moved relative to each other with the slurry composition disposed between the object and the workpiece to conduct a material removal process, such as a polishing process, and more particularly, a chemical-mechanical polishing (CMP) operation.

In another embodiment, the composition of the present disclosure can be a slurry including a liquid carrier comprising water, cerium oxide as abrasive particulate and free silicate ions. It has been surprisingly observed that the presence of free silicate ions in the slurry composition can increase the material removal rate when polishing a silicon oxide wafer by at least 3% in comparison to a slurry composition not including free silicate ions. In another aspect, the material removal rate can be increased by the presence of free silicate ions by at least 5%, such as at least 7%, or at least 10%. Not being bound to theory, it is assumed that the free silicate ions contained in the slurry composition can be in interaction with $Ce^{3+}$ ions on the surface of the cerium oxide particles, and thereby can enhance the polishing efficiency of the slurry composition when polishing a silica comprising substrate.

In one aspect the free silicate ions contained in the slurry can be obtained by dissolving a silicate compound, such as a sodium silicate salt or a potassium silicate salt. For example, the slurry can include a silicate compound selected from $Na_2SiO_3$, $Na_4SiO_4$, $Na_6Si_2O_7$, $K_2SiO_3$, or any combination thereof.

In a particular embodiment, the slurry composition can consist essentially of cerium oxide, water, and a silicate compound. As used herein, consisting essentially of cerium oxide, water, and a silicate compound means that a total of other compounds contained in the slurry may be not greater than 0.01 wt % based on the total weight of the slurry composition.

In a particular embodiment, the slurry composition can be essentially free of an oxidizer. An oxidizer can be any compound which may oxidize $Ce^{3+}$ to $Ce^{4+}$ on the cerium oxide particle surface. Non-limiting examples of an oxidizer can be a peroxide compound (e.g., hydrogen peroxide), a persulfate compound (e.g. sodium persulfate), a periodate salt (e.g., $KIO_4$), periodic acid, a perbromate salt, perbromic acid, an iodate salt (e.g., $KIO_3$), iodic acid, a bromate salt, bromic acid, a permanganate compound, or a quinone. As used herein, being essentially free of an oxidizer means that an amount of oxidizer may be not greater than 0.01 wt % based on the total weight of the slurry composition. As further demonstrated in the Examples, it has been observed that the presence of different types of oxidizers can decrease the polishing efficiency of the slurry composition when polishing a silicon dioxide containing material to a large extent. Not being bound to theory, the negative influence of an oxidizer on the polishing efficiency of a cerium oxide based slurry can be an indirect proof that by oxidizing $Ce^{3+}$ to $Ce^{4+}$ on the cerium oxide particle surface, which means lowering the amount of $Ce^{3+}$, can have a negative influence on the polishing activity of the cerium oxide particles.

In another aspect, the slurry composition can be free of any other ingredients than water, cerium oxide, a silicate compound and a pH modifier, except for unavoidable impurities.

The amount of free silicate ions in the slurry composition can be at least 0.01 mol/l, such as at least 0.02 mol/l, at least 0.03 mol/l, at least 0.05 mol/l, at least 0.1 mol/l, or at least 0.15 mol/l. In another aspect, the amount of free silicate ions may be not greater than 2 mol/l, such as not greater than 1.5 mol/l, not greater than 1.0 mol/l, not greater than 0.8 mol/l, or not greater than 0.5 mol/l, or not greater than 0.3 mol/l, or not greater than 0.2 mol/l slurry. The amount of free silicate ions in the slurry composition can be a value within any of the minimum and maximum values noted above.

In a certain aspect, the pH of the slurry composition comprising free silicate ions and cerium oxide particles may be at least be 8.5, such as at least 9.0, at least 9.5 or at least 10.0. In another aspect, the pH of the slurry composition may be not greater than 12, such as not greater than 11.5, not greater than 11.0, or not greater than 10.5. The pH of the slurry composition may be a value between any of the minimum and maximum values noted above. In a certain aspect the pH can be at least 9 and not greater than 11.0.

In a further embodiment, the average size (D50) of the cerium oxide particles of the slurry composition comprising free silicate ions can be at least 50 nm, such as at least 80 nm, at least 100 nm, at least 150 nm, at least 200 nm, or at least 230 nm. In another aspect, the size of the cerium oxide particles may be not greater than 1500 nm, such as not greater than 1300 nm, not greater than 1000 nm, not greater than 800 nm, not greater than 500 nm, not greater than 300 nm, or not greater than 260 nm. The size of the cerium oxide particles may be a value between any of the minimum and maximum values noted above.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

EMBODIMENTS

Embodiment 1

A composition comprising: a carrier comprising a liquid; and an abrasive particulate contained in the carrier, the abrasive particulate comprises on average at least 10% cerium in the abrasive particulate and wherein the abrasive particulate comprises a cerium 3+ ratio (Ce 3+/total cerium) of at least 0.1.

Embodiment 2

The composition of Embodiment 1, wherein the carrier comprises water, wherein the carrier consists essentially of water, wherein the carrier consists essentially of deionized water.

Embodiment 3

The composition of Embodiment 1, wherein the carrier is present in an amount of at least 45 wt % for a total weight of the composition, at least 50 wt % or at least 55 wt % or at least 60 wt % or at least 65 wt % or at least 70 wt % or at least 75 wt % or at least 80 wt %.

Embodiment 4

The composition of Embodiment 1, wherein the carrier is present in an amount of not greater than 97 wt % for a total weight of the composition or not greater than 95 wt % or not greater than 90 wt % or not greater than 85 wt % or not greater than 80 wt % or not greater than 75 wt % or not greater than 70 wt %.

Embodiment 5

The composition of Embodiment 1, wherein the abrasive particulate comprises an average particle size (D50) of not greater than 20 microns or not greater than 15 microns or not greater than 10 microns or not greater than 5 microns or not greater than 2 microns or not greater than 1 micron or not greater than 900 nm or not greater than 800 nm or not greater than 700 nm or not greater than 600 nm or not greater than 500 nm or not greater than 400 nm or not greater than 300 nm or not greater than 200 nm or not greater than 100 nm or not greater than 90 nm or not greater than 80 nm or not greater than 70 nm or not greater than 60 nm or not greater than 50 nm or not greater than 40 nm or not greater than 30 nm or not greater than 20 nm or not greater than 10 nm.

Embodiment 6

The composition of Embodiment 1, wherein the abrasive particulate comprises an average particle size (D50) of at least 1 nm or at least 5 nm or at least 10 nm or at least or at least 20 nm or at least 30 nm or at least 50 nm or at least 80 nm or at least 100 nm or at last 200 nm or at least 500 nm or at least 1 micron.

Embodiment 7

The composition of Embodiment 1, wherein the abrasive particulate comprises on average at least 10% total cerium in the abrasive particulate, wherein the abrasive particulate comprises an average particle size (D50) within a range of at least 1 nm and not greater than 20 microns or wherein the abrasive particulate comprises on average at least 15% total cerium or at least 30% total cerium or at least 40% total cerium or at least 50% total cerium or at least 60% total cerium or at least 70% total cerium or at least 80% total cerium or at least 90% total cerium or at least 95% total cerium.

Embodiment 8

The composition of Embodiment 1, wherein the abrasive particulate consists essentially of cerium oxide.

Embodiment 9

The composition of Embodiment 1, wherein the abrasive particulate consists of cerium oxide and is free of other oxide compounds except in impurity contents.

Embodiment 10

The composition of Embodiment 1, wherein the abrasive particulate comprises D90-D10 range value of at least 5 nm to not greater than 20 microns.

Embodiment 11

The composition of Embodiment 1, wherein the abrasive particulate comprises a span value ((D90-D10)/D50) within a range of at least 0.1 to not greater than 20.

Embodiment 12

The composition of Embodiment 1, wherein the abrasive particulate comprises a complex oxide including cerium and at least one other element, wherein the at least one other element includes a transition metal element or rare-earth element.

Embodiment 13

The composition of Embodiment 12, wherein the at least one other element is selected from the group consisting of zirconium, titanium, yttrium, praseodymium, lanthanum, hafnium, or any combination thereof.

Embodiment 14

The composition of Embodiment 12, wherein the complex oxide comprises cerium and another metal element.

Embodiment 15

The composition of Embodiment 12, wherein the complex oxide comprises a solid solution including cerium oxide and at least one other metal oxide compound.

Embodiment 16

The composition of Embodiment 12, wherein the complex oxide comprises a solid solution including a single phase material including cerium and zirconium.

Embodiment 17

The composition of Embodiment 12, wherein the abrasive particulate includes a polycrystalline material including a plurality of crystalline grains separated from each other by grain boundaries, and wherein at least 10% of the crystalline grains include a solid solution of cerium oxide and zirconium oxide.

Embodiment 18

The composition of Embodiment 17, wherein at least 30% of the crystalline grains include a solid solution of cerium oxide and zirconium oxide or at least 40% or at least 50% or at least 60% or at least 70% or at least 80% or at least 90% or at least 95%.

Embodiment 19

The composition of Embodiment 1, wherein the abrasive particulate includes a complex oxide composition including cerium oxide and zirconium oxide.

Embodiment 20

The composition of Embodiment 19, wherein the abrasive particulate includes at least 5 wt % zirconium oxide for a total weight of the abrasive particulate or at least 10 wt % zirconium oxide or at least 15 wt % zirconium oxide or at least 20 wt % zirconium oxide or at least 30 wt % zirconium oxide or at least 40 wt % zirconium oxide or at least 50 wt % zirconium oxide or at least 60 wt % zirconium oxide or at least 70 wt % or at least 80 wt % for a total weight of the abrasive particulate.

Embodiment 21

The composition of Embodiment 19, wherein the abrasive particulate includes not greater than 90 wt % zirconium oxide for a total weight of the abrasive particulate or not greater than 85 wt % zirconium oxide or not greater than 80 wt % zirconium oxide or not greater than 75 wt % zirconium oxide or not greater than 70 wt % zirconium oxide or not greater than or not greater than 65 wt % zirconium oxide or not greater than 60 wt % zirconium oxide or not greater than 55 wt % zirconium oxide or not greater than 50 wt % zirconium oxide or not greater than 45 wt % zirconium oxide or not greater than 40 wt % zirconium oxide or not greater than 35 wt % zirconium oxide or not greater than 30 wt % zirconium oxide or not greater than 25 wt % zirconium oxide or not greater than 20 wt % zirconium oxide or not greater than 15 wt % zirconium oxide or not greater than 10 wt % zirconium oxide for a total weight of the abrasive particulate.

Embodiment 22

The composition of Embodiment 19, further comprising a total cerium-to-zirconium molar ratio (total cerium)/zirconium) of at least 0.2 or at least 0.3 or at least 0.4 or at least 0.5 or at least 0.6 or at least 0.8 or at least 0.9 or at least 1 or at least 1.1 or at least 1.2 or at least 1.3 or at least 1.4 or at least 1.5 or at least 1.6 or at least 1.7 or at least 1.8 or at least 1.9 or at least 2 or at least 2.1 or at least 2.2 or at least 2.5 or at least 2.7 or at least 3 or at least 3.2 or at least 3.5 or at least 3.7 or at least 4 or at least 4.5 or at least 5 or at least 6 or at least 7 or at least 8 or at least 9 or at least 10.

Embodiment 23

The composition of Embodiment 22, wherein the total cerium-to-zirconium molar ratio (total cerium)/zirconium) is not greater than 1000 or not greater than 500 or not greater than 100 or not greater than 50.

Embodiment 24

The composition of Embodiment 1, wherein the abrasive particulate includes at least 10 wt % cerium oxide and not greater than 100 wt % cerium oxide or within a range of at least 10 wt % and not greater than 90 wt % or within a range of at least 20 wt % and not greater than 80 wt %.

Embodiment 25

The composition of Embodiment 1, wherein the abrasive particulate includes at least 10 wt % cerium oxide for a total weight of the abrasive particulate or at least 10 wt % cerium oxide or at least 15 wt % cerium oxide or at least 20 wt % cerium oxide or at least 30 wt % cerium oxide or at least 40 wt % cerium oxide or at least 50 wt % cerium oxide or at least 60 wt % cerium oxide or at least 70 wt % cerium oxide or at least 80 w % cerium oxide or at least 90 wt % cerium oxide or at least 95 wt % cerium oxide for a total weight of the abrasive particulate.

Embodiment 26

The composition of Embodiment 1, wherein the abrasive particulate includes not greater than 99 wt % cerium oxide for a total weight of the abrasive particulate or not greater than 90 wt % cerium oxide or not greater than 80 wt % cerium oxide or not greater than 70 wt % cerium oxide or not greater than 60 wt % cerium oxide or not greater than 55 wt % cerium oxide or not greater than 50 wt % cerium oxide or not greater than 45 wt % cerium oxide or not greater than 40 wt % cerium oxide or not greater than 35 wt % cerium oxide or not greater than 30 wt % cerium oxide or not greater than 25 wt % cerium oxide or not greater than 20 wt % cerium oxide or not greater than 15 wt % cerium oxide or not greater than 10 wt % cerium oxide for a total weight of the abrasive particulate.

Embodiment 27

The composition of Embodiment 1, wherein the abrasive particulate comprises a polycrystalline material including crystalline grains having a cubic structure.

Embodiment 28

The composition of Embodiment 1, wherein the abrasive particulate comprises a polycrystalline material including crystalline grains having a tetragonal structure Embodiment 29

The composition of Embodiment 1, further comprising a pH of at least 1 and not greater than 12.

Embodiment 30

The composition of Embodiment 1, further comprising a pH of at least 3 and not greater than 10.

Embodiment 31

The composition of Embodiment 1, wherein the abrasive particulate comprises Ce3+ and Ce4+, and wherein the abrasive particulate includes a ratio (Ce3+/Ce4+) of at least 0.30.

Embodiment 32

The composition of Embodiment 31, wherein the ratio (Ce3+/Ce4+) is at least 0.35, or at least 0.4 or at least 0.45 or at least 0.5 or at least 0.6 or at least 0.7 or at least 0.8 or at least 0.9 or at least 1.0 or at least 1.1 or at least 1.2 or at least 1.3 or at least 1.4 or at least 1.5 or at least 1.6 or at least 1.7 or at least 1.8 or at least 1.9 or at least 2 or at least 2.1 or at least 2.2 or at least 2.5 or at least 2.7 or at least 3 or at least 3.2 or at least 3.5 or at least 3.7 or at least 4 or at least 4.5 or at least 5 or at least 6 or at least 7 or at least 8 or at least 9 or at least 10.

Embodiment 33

The composition of Embodiment 1, wherein the ratio (Ce3+/Ce4+) is not greater than 1000 or not greater than 500 or not greater than 100 or not greater than 50.

Embodiment 34

The composition of Embodiment 1, wherein the cerium 3+ ratio (Ce 3+/total cerium) is at least 0.15 or at least 0.2 or at least 0.25 or at least 0.3 or at least 0.35 or at least 0.4 or at least 0.45 or at least 0.5 or at least 0.55 or at least 0.6 or at least 0.65 or at least 0.7 or at least 0.75 or at least 0.8 or at least 0.85 or at least 0.9 or at least 0.95 or at least 0.99.

Embodiment 35

The composition of Embodiment 1, wherein the cerium 3+ ratio (Ce 3+/total cerium) is 1 or not greater than 0.99 or not greater than 0.95 or not greater than 0.9 or not greater than 0.85 or not greater than 0.8 or not greater than 0.75 or not greater than 0.70 or not greater than 0.65 or not greater than 0.6 or not greater than 0.55 or not greater than 0.5 or not greater than 0.45 or not greater than 0.4 or not greater than 0.35 or not greater than 0.3 or not greater than 0.25 or not greater than 0.2.

Embodiment 36

The composition of Embodiment 1, wherein the abrasive particulate comprises a specific surface area within a range of at least 0.1 m2/g to not greater than 100 m2/g or within a range of at least 5 m2/g to not greater than 50 m2/g.

Embodiment 37

The composition of Embodiment 1, further comprising at least one additive selected from the group consisting of oxidizers, dispersants, surfactants, lubricants, or any combination thereof.

Embodiment 38

The composition of Embodiment 1, wherein the abrasive particulate comprises not greater than 1 wt % of carbides, nitrides, borides, diamond, or any combination thereof for the total weight of the abrasive particulate, or not greater than 0.5 wt % or not greater than 0.1 wt % or not greater than 0.01 wt % or not greater than 0.001 wt %.

Embodiment 39

The composition of Embodiment 1, further comprising a secondary particulate mixed with the abrasive particulate in the carrier, wherein the secondary particulate comprises at least one material selected from the group consisting of diamond, cBN, silica, alumina, silicon carbide, boron carbide, zirconia-containing particles, or any combination thereof.

Embodiment 40

The composition of Embodiment 1, wherein the abrasive particulate comprises not greater than 1 wt % of silica, alumina, boride oxide, or any combination thereof for the total weight of the abrasive particulate, or not greater than 0.5 wt % or not greater than 0.1 wt % or not greater than 0.01 wt % or not greater than 0.001 wt %.

Embodiment 41

The composition of Embodiment 1, further comprising a stability of at least 10% greater than a conventional cerium oxide-containing slurry or at least 15% or at least 20% or at least 25% or at least 30% or at least 40% or at least 50% or at least 75% or at least 90%.

Embodiment 42

A method for forming an abrasive particulate for use in an abrasive slurry comprising:
combining a first precursor material and a second precursor material to form a mixture, wherein the first precursor material comprises cerium and the second precursor material comprises at least one metal element other than cerium; and
treating the mixture in a non-oxidizing atmosphere to create an abrasive particulate comprising a cerium 3+ ratio (Ce 3+/total cerium) of at least 0.1.

Embodiment 43

The method of Embodiment 42, wherein the first precursor material includes a salt including cerium.

Embodiment 44

The method of Embodiment 42, wherein the first precursor material includes an oxide comprising cerium.

Embodiment 45

The method of Embodiment 42, wherein the first precursor material comprises at least one of a nitrate, chloride, acetate, sulfate, carbonate, or any combination thereof.

Embodiment 46

The method of Embodiment 42, wherein the first precursor material comprises cerium nitrate.

Embodiment 47

The method of Embodiment 42, wherein the second precursor material comprises a salt including at least one transition metal element or rare earth element.

Embodiment 48

The method of Embodiment 42, wherein the second precursor material comprises at least one element selected from the group consisting of zirconium, titanium, yttrium, praseodymium, lanthanum, hafnium or any combination thereof.

Embodiment 49

The method of Embodiment 42, wherein the second precursor material comprises at least one of a nitrate, hydroxide, chloride, acetate, sulfate, carbonate, or any combination thereof.

Embodiment 50

The method of Embodiment 42, wherein the second precursor material comprises material selected from the group consisting of zirconium oxychloride, zirconium nitrate, zirconium acetate, zirconium hydroxide, zirconium oxide, zirconium carbonate, titanium chloride, titanium sulfate, titanium hydroxide, titanium oxide, titanium carbonate, yttrium nitrate, yttrium chloride, yttrium hydroxide, yttrium oxide, yttrium carbonate, praseodymium nitrate, praseodymium chloride, praseodymium hydroxide, praseodymium oxide, praseodymium carbonate, lanthanum nitrate, lanthanum chloride, lanthanum hydroxide, lanthanum oxide, lanthanum carbonate, or any combination thereof.

Embodiment 51

The method of Embodiment 42, further comprising precipitation of at least one element from the first precursor material or at least one element from the second precursor material from the mixture.

Embodiment 52

The method of Embodiment 42, further comprising precipitation of a cerium containing species from the mixture.

Embodiment 53

The method of Embodiment 42, further comprising extraction of a cerium-containing species from the mixture using at least one process selected from the group consisting of precipitation or hydrothermal treatment.

Embodiment 54

The method of Embodiment 42, further comprising extraction of a Ce3+ comprising species from the mixture using at least one process selected from the group consisting of precipitation or hydrothermal treatment.

Embodiment 55

The method of Embodiment 42, further comprising impregnation of the second precursor material with the first precursor material.

Embodiment 56

The method of Embodiment 42, further comprising impregnation of a zirconium-containing second precursor material with cerium oxide formed from a cerium-containing first precursor material.

Embodiment 57

The method of Embodiment 42, wherein treating comprises heating.

Embodiment 58

The method of Embodiment 42, wherein treating comprises calcining.

Embodiment 59

The method of Embodiment 58, wherein calcining is conducted at a calcination temperature within a range of at least 800° C. to not greater than 1300° C.

Embodiment 60

The method of Embodiment 42, wherein treating comprises heating in a reducing atmosphere comprising a noble gas, nitrogen, or a combination thereof.

Embodiment 61

The method of Embodiment 42, wherein treating comprises heating in an atmosphere comprising flowing hydrogen and nitrogen.

Embodiment 62

The method of Embodiment 42, wherein treating comprises heating in an atmosphere having a partial pressure of oxygen or not greater than 10 Pa or not greater than 5 Pa or not greater than 1 Pa or not greater than 0.1 Pa.

Embodiment 63

The method of Embodiment 42, further comprising:
extracting from the mixture a cerium-containing species;
drying the cerium-containing species; and
calcining the cerium containing species in a reducing atmosphere to create an abrasive particulate having a ratio of Ce3+ to Ce4+ of at least 0.3, or at least 0.4, or at least 0.5, or at least 0.6.

Embodiment 64

A method of conducting a material removal operation comprising: moving an object relative to a substrate comprising silicon;
providing a slurry between the object and the substrate, wherein the slurry comprises:
a carrier comprising a liquid; and an abrasive particulate contained in the carrier, the abrasive particulate comprising a cerium 3+ ratio (Ce 3+/total cerium) of at least 0.1, such as at least 0.2, at least 0.3, or at least 0.35.

Embodiment 65

A slurry composition comprising a liquid carrier comprising water, cerium oxide particles, and free silicate ions, wherein a material removal rate when polishing a silicon oxide wafer is increased by at least 3% in comparison to a slurry composition not including free silicate ions.

Embodiment 66

The slurry composition of Embodiment 65, wherein the material removal rate is increased by at least 5%, such as at least 7%, or at least 10%.

Embodiment 67

A slurry composition consisting essentially of water, cerium oxide particles and a silicate compound, wherein the silicate compound is dissociated in free silicate ions and counter-cations.

Embodiment 68

The slurry composition of Embodiment 67, wherein a material removal rate when polishing a silicon oxide wafer is increased by at least 3%, such as at least 5%, such as at least 7%, or at least 10% in comparison to a slurry composition not including free silicate ions, such as Embodiment 69

The slurry composition of Embodiments 65 to 68, wherein the slurry composition comprises Na2SiO3, Na4SiO4, Na6Si2O7, K2SiO3, or any combination thereof.

Embodiment 70

The slurry composition of any of Embodiments 65 to 69, wherein an amount of free silicate ions is at least 0.002 mol/l and not greater than 2.0 mol/l.

Embodiment 71

The slurry composition of any of Embodiments 65 to 70, wherein a pH of the slurry composition is at least 7.5 and not greater than 11.5.

Embodiment 72

The slurry composition of any of Embodiments 65 to 71, wherein an amount of the cerium oxide is at least 0.5 wt %, such as at least 1 wt %, at least 3 wt %, or at least 5 wt % based on a total weight of the slurry.

Embodiment 73

The slurry composition of any of Embodiments 65 to 72, wherein an amount of the cerium oxide is not greater than 30 wt %, such as not greater than 20 wt %, or not greater than 10 wt %, or not greater than 5 wt % based on a total weight of the slurry.

Embodiment 74

The slurry composition of any of Embodiments 65 to 73, wherein the slurry composition is essentially free of an oxidizer.

Embodiment 75

The slurry composition of any of Embodiments 65 to 73, wherein the slurry composition is essentially free of an oxidizer selected from the group of a peroxide compound, persulfate compound, a periodate salt, periodic acid, a perbromate salt, perbromic acid, an iodate salt, iodic acid, a bromate salt, bromic acid, a permanganate compound, or a quinone.

EXAMPLES

Example 1

Samples of abrasives for use in abrasive slurries were created by using two precursor materials. The first precursor material was cerium nitrate and the second precursor was zirconium hydroxide, commercially available from ZirPro Handan. A mixture was created using 20 wt % of the second precursor combined with a remainder amount of deionized water. A 1 mol/L solution of cerium nitrate ($Ce(NO_3)_3$) targeting a stoichiometric amount of cerium, such that the resulting amount of 50% cerium oxide by weight would be formed was added to the mixture.

Thereafter, an ammonia solution having a concentration of 5 mol/L was slowly added to the mixture to reach a pH of 9, whereby cerium oxide precipitated onto the second precursor (zirconium hydroxide). The mixture was filtered to remove the impregnated powder. The powder was washed with distilled water and dried at 600° C. for 5 hours, followed by calcining at 1150° C. for 3 hours. Calcining was conducted under three different conditions: (a) under air (Sample A); b) under argon (Sample B), and c) under vacuum with 1 wt % carbon black from Cabot (Sample C), to create three different samples, as also summarized in Table 1. The partial pressure of oxygen for Sample A during calcination was 20,000 Pa, for sample B. The partial pressure of oxygen for Sample B during calcination was 2 Pa. The partial pressure of oxygen for Sample C during calcination was 1 Pa.

TABLE 1

| Sample | Size | SSA ($m^2/g$) | Density ($g/cm^3$) | XRD |
|---|---|---|---|---|
| Sample A (under air) | D10 = 60 nm, D50 = 115 nm, D90 = 5 μm | 9 | 6.59 | 40% cubic CeO2 and 60% tetragonal ZrO2—CeO2 solid solution |
| Sample B (under argon) | D10 = 87 nm, D50 = 108 nm, D90 = 5 μm | 12 | 6.50 | NA |
| Sample C (Under vacuum with Carbon) | NA | NA | NA | NA |

After calcining, each of the samples was milled under wet conditions at a constant pH of 4.5 using a horizontal bead mill (Netzsch mill) with high purity alumina media until the desired size of the abrasive particulate was achieved. The average particle size of the abrasive particulate was measured by using a Malvern Nanosizer Dynamic Light Scattering instrument. Details regarding the abrasive particulate samples after the milling process are provided in Table 2.

TABLE 2

| Sample | Size | SSA ($m^2/g$) | Partial Oxygen Pressure [Pa] |
|---|---|---|---|
| Sample A (under air) | D10 = 60 nm, D50 = 96 nm, D90 = 107 nm | 9.62 | 20,000 |
| Sample B (under argon) | D10 = 80 nm, D50 = 101 nm, D90 = 106 nm | NA | 2 |
| Sample C (Under vacuum with Carbon) | NA | NA | 1 |

The cerium $3^+$ ratio ($Ce^{3+}$/total cerium) for sample B was analyzed by conducting inductively coupled plasma mass spectroscopy (ICP) combined with temperature programmed oxidation (TPO). The obtained ratio of $Ce^{3+}$/total cerium was 0.38.

Example 2

Effect of Silicate Ions on TEOS Wafer Removal Rate of Ceria Containing Slurries.

A series of ceria slurries was prepared containing a) 1 wt % ceria and 0.026 mol/l sodium silicate and a varying pH: pH 8.1, pH 10.3, and pH 12.2; and b) 1 wt % ceria, no sodium silicate, and a pH of 8.2 and 10.0.

The material removal rate of the ceria slurries was tested on silica wafers made from tetraethyl orthosilicate (TEOS). The following testing method was conducted:

A summary of the tested samples and obtained material removal rate is shown in Table 3:

TABLE 3

| Sample | Amount of $Na_2SiO_3$ [mol/l] | pH | MRR [Å/min] | Zeta Potential [mV] | Change in MRR [%] - based on blank at closest pH |
|---|---|---|---|---|---|
| S1 | — | 8.2 | 7814 | 21.7 | Blank |
| S4 | 0.026 | 8.1 | 7935 | −22.6 | +1.55 |
| S2 | — | 10.0 | 7105 | 9.81 | Blank |
| S5 | 0.026 | 10.3 | 8160 | −46.0 | +11.48 |
| S6 | 0.026 | 12.3 | 7710 | −45.7 | +9.51 |

The data shown in Table 3 demonstrate that by adding of silicate ions to the ceria containing slurry composition, the MRR can be further improved. This effect appears to be best at a pH around 10. The adding of another type of anions, such as $NO_3^-$ ions did not lead to an improved MRR. It can be also seen that adding silicate ions caused a large change in the zeta potential from positive values to negative values.

Example 3

Effects of Oxidizers on TEOS Wafer Material Removal Rate of Ceria Slurries.

A series of ceria slurries was prepared including different types and amounts of oxidizers. In all slurries, ceria having an average particles size of 250 nm was used (ceria 9280 from Saint-Gobain in an amount of 1 wt %. The tested oxidizers were hydrogen peroxide ($H_2O_2$), ammonium persulfate (APS), $HIO_4+KIO_4$ and $KIO_3$. A summary of the slurry samples and the obtained material removal rates is shown in Table 4.

TABLE 4

| Sample | Oxidizer | Amount of oxidizer [mol/l]] | pH | MMR [Å/min] | Zeta Potential [mV] | Reduction in MMR [%] |
|---|---|---|---|---|---|---|
| S2 | | | 8.2 | 7814 | 21.7 | Blank comparison |
| S7 | | | 4.2 | 5207 | 26.8 | Blank comparison |
| S8 | $H_2O_2$ | 0.026 | 4.1 | 926 | 7.75 | −82.22 |
| S9 | $H_2O_2$ | 0.183 | 4.4 | 1477 | | −71.64 |
| S10 | APS | 0.026 | 4.2 | 3255 | 5.51 | −37.49 |
| S11 | APS | 0.183 | 4.2 | 2635 | 6.74 | −50.60 |
| S12 | $HIO_4 + KIO_4$ | 0.026 | 4.2 | 2066 | −16.4 | −60.32 |
| S13 | $HIO_4 + KIO_4$ | 0.183 | 4.2 | 526 | −28.7 | −89.90 |
| S14 | $KIO_3$ | 0.183 | 4.2 | 1652 | −1.59 | −68.28 |

The experiments summarized in Table 4 show that oxidizers do not have a supporting influence on the MRR of the tested ceria slurries, and decrease the MRR to a high percentage in comparison to the blank sample using 1% ceria as the only ingredient in the slurry and adjusted to pH 4.2 with $HNO_3$. Not being bound to theory, an explanation for the negative influence of oxidizers on the MRR can be the oxidation of $Ce^{3+}$ on the surface of the ceria particles to $Ce^{4+}$, which is an indirect proof that $Ce^{3+}$ ions may have importance for the polishing efficiency of ceria particles.

Conduction of the Polishing Tests to Determine the Material Removal Rate of a Slurry:

For the polishing tests, a Strasbaugh 6EC polishing tool was used. The polishing was conducted on round TEOS wafers (silicon oxide wafers made from tetraethyl orthosilicate). The TEOS wafers had a round shape with a diameter of 6 inches and a thickness of 10,000-20,000 Å. The following polishing conditions were used:
Downforce: 4.5 psi
Flow rate: 150 ml/min
Backpressure: 1 psi
Platen speed: 93 rpm
Carrier speed: 43 rpm
Polishing time: 30 seconds.

The weight of the wafer before and after polishing was measured with a precision balance readable at least 0.0001 gram and with a capacity of at least 200 grams. The material removal rate was calculated based on the weight loss of the wafer in the tested time period and converted to the unit Å/min. Each polishing test was repeated three times and an average value was calculated.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The Abstract of the Disclosure is provided to comply with Patent Law and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description, with each claim standing on its own as defining separately claimed subject matter.

What is claimed is:

1. A composition comprising:
   a carrier comprising a liquid; and
   an abrasive particulate contained in the carrier, the abrasive particulate comprises on average at least 10% cerium in the abrasive particulate and wherein the abrasive particulate comprises a cerium 3+ ratio (Ce 3+/total cerium) of at least 0.1, and wherein the abrasive particulate includes a complex oxide composition including cerium oxide and zirconium oxide.

2. The composition of claim 1, wherein the abrasive particulate comprises a complex oxide including cerium and at least one other element, wherein the at least one other element includes a transition metal element or rare-earth element.

3. The composition of claim 1, wherein the abrasive particulate comprises at least 30 wt % cerium oxide.

4. The composition of claim 1, wherein the abrasive particulate comprises a polycrystalline material including crystalline grains having a cubic structure.

5. The composition of claim 1, wherein the abrasive particulate comprises $Ce^{3+}$ and $Ce^{4+}$, and wherein the abrasive particulate includes a ratio ($Ce^{3+}/Ce^{4+}$) of at least 0.30.

6. The composition of claim 3, wherein an amount of the zirconium oxide is at least 5 wt % based on the total weight of the abrasive particulate.

\* \* \* \* \*